June 5, 1923.
1,457,749
J. H. RAST
LOCK NUT
Filed Nov. 17, 1921
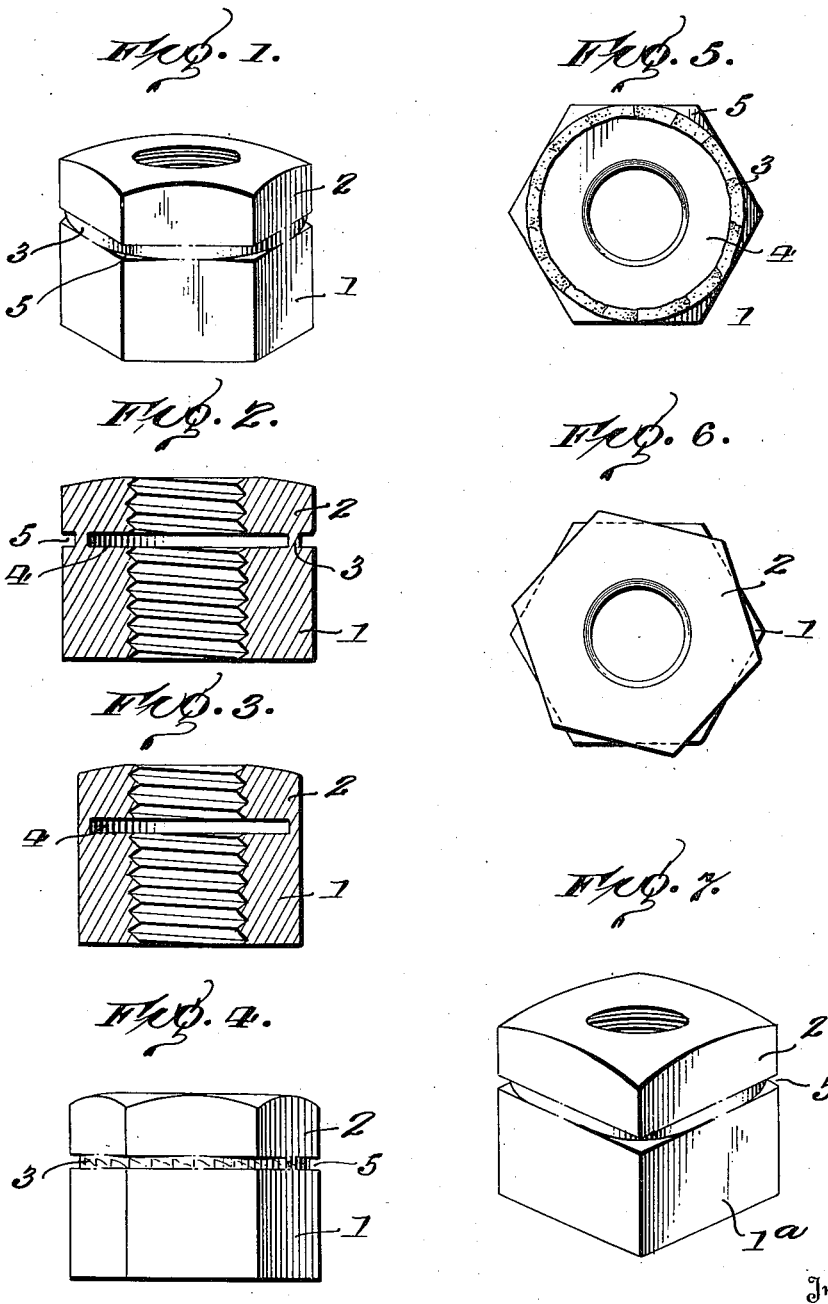
Inventor
Julius H. Rast.
By Prentiss, Stone & Boyden
Attorneys Patented June 5, 1923.

1,457,749

UNITED STATES PATENT OFFICE.

JULIUS H. RAST, OF CHARLESTON, SOUTH CAROLINA.

LOCK NUT.

Application filed November 17, 1921. Serial No. 515,833.

*To all whom it may concern:*

Be it known that I, JULIUS H. RAST, a citizen of the United States, residing at Charleston, in the county of Charleston and State of South Carolina, have invented certain new and useful Improvements in Lock Nuts, of which the following is a specification.

My invention relates to combination nuts, lock nuts and lock washers.

More specifically my invention relates to a single nut separable into two parts with an intermediate locking portion spaced from the threads so that the locking portion cannot mutilate the threads.

An object of my invention is to provide an improved nut which combines in a single piece the three distinct functions of nut, lock-washer and lock-nut, thus greatly simplifying such devices and correspondingly cheapening their production.

Other objects and advantages of this invention will appear in the following specification and claims, and the accompanying drawing, wherein:

Fig. 1 is a perspective view of a hexagonal nut embodying my invention.

Fig. 2 is a central vertical section of the nut shown in Fig. 1 through opposite edges.

Fig. 3 is a central vertical section of the nut shown in Fig. 1 on a plane perpendicular to one pair of flats.

Fig. 4 is an elevation of the nut shown in Fig. 1 illustrating the nature of fracture of the same during tightening.

Fig. 5 is a top view of the lower half of the nut after fracture as in Fig. 4.

Fig. 6 is a top view of the nut in place in its final position.

Fig. 7 is a perspective view of a square nut embodying my invention.

Referring to the drawings, a hexagonal nut 1 of standard dimensions is shown, having integral therewith my lock nut 2, the two nuts being joined by a cylindrical portion 3. These nuts may be made in the usual screw machine by cutting an internal groove 4 in the bore prior to the threading operation, said groove extending nearly to the diameter of the nut across the flats. A corresponding groove 5 is provided in the outside of the nut, extending however, not quite to the "flat" diameter. The term "flat diameter" is used in this specification and in the claims in its usual technical significance to designate the distance between two opposite faces or flats of the nut which are adapted to be held by the wrench. In round nuts with only one flat, or even without any, this term is to be understood to mean a diameter equal to twice the minimum radius of the nut. The result of these two grooves is that a relatively thin cylindrical portion 3 is produced.

When a compound nut of this type is screwed upon a bolt or the like, it behaves as an ordinary nut, until the lower face of the nut 1 engages its final seat, whereupon further turning stress applied to the nut 2 alone first strains the portion 3 whereby its fibers are placed under diagonal tension, and finally fractures the fibers, in a generally serrated fashion as illustrated in Fig. 4, the serrations pointing in the direction the nut has been tightened. Thus a structure analogous to the ordinary spring lock-washer is produced, and the nut 2 turns more readily in the tightening direction than in the opposite direction. At the same time the upper nut 2 acts as an ordinary lock-nut.

Certain advantages result from the internal groove 4. Due to the groove, the portion 3 when it fractures and becomes battered out of shape by the pressure of the nut 1 and lock-nut 2, does not mutilate the threads of the bolt or the nuts, as would be the case in a nut having no internal groove, and a deep external groove alone. Nuts once applied may be removed and the parts used again if desired. Owing to the large diameter of the fractured annulus 3 a more regular fracture is secured and a more nearly uniform seating of the nut results, while due to the same cause, a larger resistance to unscrewing of the nut 2 is attained.

Nuts of the type disclosed are advantageous in that they obviate the necessity of providing three separate units, namely, nuts, lock-nuts and lock-washers, in proper numbers. For instance, there should be ordinarily the same number of each unit, but owing to the difference in weight of these units, it is difficult to gauge correctly the proper amount of each to furnish, with the result that there is usually an excess or deficiency of one or more of the units, resulting in delay and waste. With a combination nut of the type disclosed herein, such waste is completely eliminated, as it is manifestly impossible to have more of one unit than of another.

It is obviously immaterial what is the outer shape of the nut, for instance, square, hexagonal or other usual or known shape, as the invention resides in the provision of a refrangible portion of the type disclosed in a nut of any kind, and while the groove 4 shown in the drawing is of rectangular shape, it is obvious that most of the advantages of the invention may be attained also with other shapes of grooves, the only essential thing being that the groove be so shaped and placed that a refrangible portion 3 results, spaced far enough from the threads of the nut to avoid mutilation thereof upon fracture.

Having disclosed my invention, I claim:

1. A unitary two part nut having the parts separable by relative axial rotation and having an internal annular groove, the lateral wall of which is spaced from the threads and is frangible under a relative rotary movement of the two parts of the nut, the relative pitch of the threads in the two parts remaining unchanged with respect to each other in the relative turning movement, one of said two parts having a substantially flat outer end face and lateral flat faces for the reception of a tool.

2. A unitary two part nut having the parts separable by relative axial rotation and having an internal groove of diameter slightly less than the distance across the flats of the nut, and an external groove in substantial alignment with the internal groove, whereby a relatively thin annulus remains between the two grooves, the relative pitch of the threads in the two parts remaining unchanged after a relative turning movement of the two parts, both of the two parts of said nut having flat lateral faces for the reception of a tool.

3. A single nut comprising two end parts separably secured together, and having an intermediate locking portion between said two parts and spaced from the threads, both of the two parts of said nut having flat lateral faces for the reception of a tool, said flat faces on both parts lying in the same plane when said nut is unitary.

4. A single nut comprising two threaded portions separable by relative axial rotation and welded together at a surface of contact remote from their threads and having no united portion immediately adjacent the threads, the weld constituting a relatively weak portion whereby the two portions of the nut may be separated by fracture of the weld, the relative pitch of the threads in the two parts remaining unchanged after a relative turning movement of the two parts, both of the two parts of said nut having flat lateral faces for the reception of a tool, said flat faces on both parts lying in the same plane when said nut is unitary.

In testimony whereof I affix my signature.

JULIUS H. RAST.